United States Patent
Kojima et al.

(10) Patent No.: US 8,074,483 B2
(45) Date of Patent: Dec. 13, 2011

(54) TWO-PIECE CAN, METHOD FOR MANUFACTURING SAME, AND STEEL SHEET THEREFOR

(75) Inventors: Katsumi Kojima, Tokyo (JP); Yuka Nishihara, Tokyo (JP); Hiroshi Kubo, Tokyo (JP); Yoshihiko Yasue, Tokyo (JP); Yasuhide Oshima, Tokyo (JP); Hiroki Iwasa, Tokyo (JP)

(73) Assignee: JFE Steel Corrporation (JP)

(*) Notice: Subject to any disclaimer, the term of this patent is extended or adjusted under 35 U.S.C. 154(b) by 980 days.

(21) Appl. No.: 11/990,254

(22) PCT Filed: Aug. 10, 2006

(86) PCT No.: PCT/JP2006/316131
§ 371 (c)(1),
(2), (4) Date: Feb. 7, 2008

(87) PCT Pub. No.: WO2007/020956
PCT Pub. Date: Feb. 22, 2007

(65) Prior Publication Data
US 2009/0217729 A1  Sep. 3, 2009

(30) Foreign Application Priority Data

Aug. 12, 2005 (JP) ................. 2005-234546
Aug. 12, 2005 (JP) ................. 2005-234549

(51) Int. Cl.
*B21D 11/10* (2006.01)
*B21D 22/00* (2006.01)
(52) U.S. Cl. ........................................ 72/379.4; 72/348
(58) Field of Classification Search ............ 72/46, 342.1, 72/347–349, 379.4
See application file for complete search history.

(56) References Cited

U.S. PATENT DOCUMENTS 3,924,437 A   12/1975  Hörtig
5,072,605 A * 12/1991  Imazu et al. .................. 72/46
5,179,854 A *  1/1993  Matsui et al. ................ 72/349
(Continued)

FOREIGN PATENT DOCUMENTS

JP        59-35344 B2    8/1984
(Continued)

OTHER PUBLICATIONS

Federation of European Aerosol Association Standard No. 215 (Sep. 1993), No. 219 (Sep. 1993) and No. 220 (Mar. 2002).

*Primary Examiner* — Teresa Ekiert
(74) *Attorney, Agent, or Firm* — DLA Piper LLP (US)

(57) ABSTRACT

We manufacture a two-piece can by the method using a laminated steel sheet as the base material, having the steps of: drawing a cylindrical blank for several times to form a can body in a shape of cylinder integrated with bottom; forming a tapered part extending outward from the can body in the radial direction thereof at the tip of the opening of the can body; applying diametral reduction to the tapered part to the diameter of the can body; and applying diametral reduction to the opening side of the can body to a diameter smaller than the diameter of the can body, while satisfying the formulae (1) and (2), $$1.5 \leq h/(R-R') \quad (1)$$

$$d/R \leq 0.25 \quad (2)$$

where h is the height from the can bottom to the tip of the opening, R is the circular blank positional radius, r is the radius of the can bottom, and d is the radius of the tip of the opening.

25 Claims, 4 Drawing Sheets

U.S. PATENT DOCUMENTS 5,753,328 A * 5/1998 Miyazawa et al. ............ 428/35.8
5,778,723 A * 7/1998 Diekhoff ......................... 72/356

FOREIGN PATENT DOCUMENTS

| | | |
|---|---|---|
| JP | 63-168238 A | 7/1988 |
| JP | 1-228567 A | 9/1989 |
| JP | 8-309465 A | 11/1996 |
| JP | 9-39975 A | 2/1997 |
| JP | 10-24973 A | 1/1998 |
| JP | 2001-246695 A | 9/2001 |
| JP | 2003-500306 | 1/2003 |
| JP | 2004-148324 A | 5/2004 |

* cited by examiner

TWO-PIECE CAN, METHOD FOR MANUFACTURING SAME, AND STEEL SHEET THEREFOR

RELATED APPLICATION

This is a §371 of International Application No. PCT/JP2006/316131, with an international filing date of Aug. 10, 2006 (WO 2007/020956 A1, published Feb. 22, 2007), which is based on Japanese Patent Application Nos. 2005-234546, filed Aug. 12, 2005, and 2005-234549, filed Aug. 12, 2005.

TECHNICAL FIELD

This disclosure relates to a two-piece can used for container of varieties of sprays, including metal container for aerosol.

BACKGROUND

Metal containers for aerosol, for example, are largely grouped into three-piece cans and two-piece cans. The three-piece can has a structure of a can body prepared by joining edges of cylindrically-shaped rectangular sheet, and a can bottom and a can lid (dome top) attached to the respective ends of the can body. The name of the three-piece can comes from the three structural elements of the members. When the three-piece can is used for spraying, the dome top is further equipped with a mounting cap having an ejection valve, (when the term "mounting cap" is used hereinafter, the cap is equipped with the ejection valve). Therefore, when the mounting cap is counted, the number of structural members becomes four. Since, however, beverage cans and food cans which have a can body joining the edges of cylindrically-formed metal sheet are usually called the "three-piece cans," we also name the cans having the above structure as the "three-piece cans."

The two-piece can is fabricated by reducing the diameter of the can body, formed into a shape of cylinder integrated with bottom, at the opening end side, and by attaching the mounting cap to the opening. For the spraying use, the two-piece can has only one structural member, or the can body, except for the mounting cap. In some cases the can body is called the one-piece can or monoblock can. Since, however, for beverage cans and food cans, the can having the can body formed into a shape of cylinder integrated with bottom is widely called the "two-piece," we also name the can body having the structure as the "two-piece can." The two-piece can has a seamless can body, and is treated by diametral reduction in a range from the can body toward the mounting cap in smooth and continuous shape. Therefore, compared with the three-piece can, the two-piece can has superior beautifulness in appearance. As a result, the two-piece can is widely adopted by the users emphasizing the appearance of package for appealing the product of aromatic substance, antiperspirant, and hair conditioner.

The base material for a three-piece can and a two-piece can is normally steel sheet for the three-piece can, and the base material for a two-piece can is normally aluminum. The two-piece can adopts aluminum because aluminum is softer than steel sheet so that aluminum is relatively easily worked into the shape of aerosol can specified in Federation of European Aerosol Association Standard Nos. 215, 219 and 220 through the forming of the can body in a shape of a cylinder integrated with a bottom by impact-forming, drawing-redrawing forming, drawing-redrawing-ironing forming, and the like, followed by diametral reduction of the opening end. A more important point is that, since aluminum has higher corrosion resistance than that of steel sheet, the corrosion resistance to the contents and the rust-generation on the outer face raise little problem under exposure of an aerosol can to a humid environment. To the contrary, steel sheet has high strength and is inexpensive. Consequently, if steel sheet is applied to an aerosol can which needs high pressure strength, the can sheet thickness can be reduced while assuring sufficient can strength, thereby decreasing the base material cost. From the above consideration, there are studies of fabrication of two-piece cans using a high steel sheet having increased corrosion resistance.

For example, the methods for fabricating a two-piece aerosol can using a steel sheet having increased corrosion resistance are disclosed in Published Japanese Patent Translation of PCT Application 2003-500306 for the method to increase the corrosion resistance of the steel sheet itself, in Japanese Patent Laid-Open No. 63-168238 for the method in which the surface of steel sheet is laminated by a metal having high corrosion resistance, in Japanese Patent Laid-Open No. 9-39975 for the method in which the surface of steel sheet is laminated by a coating film, and in Japanese Patent Laid-Open Nos. 1-228567 and 10-24973 for the method in which the surface of steel sheet is laminated by a film.

Published Japanese Patent Translation of PCT Application 2003-500306 for the method of increasing the corrosion resistance of steel sheet discloses a technology to adopt a highly anticorrosive stainless steel as the steel sheet. Stainless steel is, however, an expensive one, though the corrosion resistance is high, thus the method increases the cost.

Japanese Patent Laid-Open No. 63-168238, in which the surface of steel sheet is coated with a metal having high corrosion resistance, discloses a technology which uses a steel sheet coated with aluminum, thereby avoiding the rust generation at the can bottom of the two-piece aerosol can formed by drawing and ironing. The method may avoid rust generation at the can bottom where the degree of working is small. Since, however, the can body which is subjected to drawing and ironing suffers damage of aluminum coating, the rust generation may occur.

Japanese Patent Laid-Open No. 9-39975, which is the method of coating the surface of steel sheet with a lacquer layer, discloses a technology relating to the inside-lacquered metal container having a cured polyamide-imide-based lacquer layer. Although the technology is described to be able to use a steel sheet as the base material for a two-piece aerosol can, the Examples relating to the steel sheet in the description are only for three-piece cans subjected to a small degree of working, and there is no satisfactory description about the corrosion resistance for the steel sheet which is worked into a two-piece can subjected to high degree of working, and the effect is not known. In addition, the specification describes that the technology can be applied either to the formed can body or to the metal sheet before working. However, for the case of applying the technology to an aluminum-made two-piece can, given in the Examples, the lacquer coating after forming the can body is described, but there is no detail example of the case that the metal sheet before forming is coated with lacquer layer. To this point, according to the investigations conducted by us, when a steel sheet coated by a thermally cured lacquer layer was worked into a two-piece aerosol can subjected to a high degree of working, the lacquer layer was damaged by the working, thus failing to attain sufficient corrosion resistance.

In view of corrosion resistance, the method of laminating the surface of steel sheet by a film is a promising one. Japanese Patent Laid-Open No. 1-228567 discloses a technology of fabricating an aerosol can using also a steel sheet laminated by a biaxially oriented film of poly-ethylene terephthalate. According to the technology, since the drawn can body is laminated by a not-damaged laminate film, the corrosion resistance is strong. However, the corrosion resistance on the can body obtained by the technology is maintained only for the can at a small working degree, receiving no diametral reduction at the opening end of the can body, as given in the Examples, and there is no consideration of the corrosion resistance on applying to the can worked into the shape of aerosol can, specified in Federation of European Aerosol Association Standard Nos. 215, 219 and 220.

Japanese Patent Laid-Open No. 10-24973 discloses a technology relating to an aerosol can which is fabricated by drawing a steel sheet laminated by a composite film composed of a polypropylene resin layer laminated on both sides of a vinylidene chloride resin layer via an acid-modified polyolefin resin, respectively. Since the technology uses a steel sheet laminated by a film, the can body having high corrosion resistance is expected to be obtained. For the method of drawing, however, a detailed description of working method is not given, only describing in the Examples that an aerosol can having a shape of 45 mm in diameter and 120 mm in height was obtained. In particular, no disclosure is given on the corrosion resistance after diametral reduction at the opening end of the can body.

As of those technologies, the use of a laminated steel sheet, having the laminate of an organic resin film, as the base material of the can, as in Japanese Patent Laid-Open Nos. 1-228567 and 10-24973, is advantageous in terms of corrosion resistance. Our investigations, however, revealed that sole application of laminated steel sheet of the conventional technologies is not satisfactory to obtain the two-piece aerosol can.

Specifically, forming of a two-piece aerosol can having a standard shape specified in Federation of European Aerosol Association Standard Nos. 215, 219 and 220 needs to form a laminated steel sheet at a very high degree of working, which induces separation on laminated steel sheet during the forming step, resulting in failing to maintain sufficient corrosion resistance.

Thus, it could be advantageous to provide a two-piece can having sufficient can strength and high corrosion resistance using a laminated steel sheet which is high in strength, relatively inexpensive, and high in corrosion resistance, and to provide a forming method which easily manufactures the two-piece can without generating separation of laminate film.

Through our studies, we found the following. First, the can strength of the two-piece can becomes sufficient at a low cost by using a laminated steel sheet high in strength, relatively inexpensive, and high in corrosion resistance as the base material of the two-piece aerosol can. Regarding the prevention of deterioration of corrosion resistance, occurring accompanied with the separation of laminate film and the like during working of steel sheet as the base material for the two-piece can, we found that it is effective to form the opening end in a state of being clamped between a drawing die and a blank holder, without generating sliding. In concrete terms, a means to avoid damages on the laminated steel sheet at the opening end of the can body is to form a tapered part extending outward from the can body in the radial direction thereof at the tip of the opening of the can body, before the final drawing step, followed by applying diametral reduction to the tapered part to the diameter of the can body.

Thus, selected aspects of our methods, steel sheets and two-piece cans include:

1. A method for forming two-piece can using a laminated steel sheet as a base material, having the steps of: blanking the laminated steel sheet; forming a can body in a shape of cylinder integrated with bottom by applying repeated several cycles of drawing to a circular blank obtained by blanking the laminated steel sheet; forming a dome protruding inside of the can at the can bottom; trimming the opening of the can body; applying diametral reduction to the opening of the can body after trimming to a diameter smaller than the diameter of the can body, while satisfying the formulae (1) and (2); forming a bead at the opening end of the can body after the diametral reduction, thus obtaining the two-piece can, wherein the above working steps include the step of applying heat treatment to the laminated steel sheet during the working steps, and wherein the heat treatment step includes the step of heating the laminated steel sheet to a temperature in a range from the glass transition point of the film of the laminated steel sheet to the melting point thereof +30° C., followed by applying rapid cooling to the laminated steel sheet to a temperature of the glass transition point or below within 30 seconds after the heating, $$1.5 \leq h/(R-r) \tag{1}$$

$$d/R \leq 0.25 \tag{2}$$

where, h is the height from the can bottom to the tip of the opening, R is the circular blank positional radius, r is the radius of the can bottom, and d is the radius of the tip of the opening.

2. A method for forming two-piece can using a laminated steel sheet as a base material, having the steps of: blanking the laminated steel sheet; forming a can body in a shape of cylinder integrated with bottom by applying repeated several cycles of drawing to a circular blank of the laminated steel sheet obtained by blanking the laminated steel sheet; forming a dome protruding inside of the can at the can bottom; trimming the opening of the can body; applying diametral reduction to the opening of the can body after trimming to a diameter smaller than the diameter of the can body, while satisfying the formulae (1) and (2); forming a bead at the opening end of the can body, thus obtaining the two-piece can, wherein the above working steps include the step of applying heat treatment to the laminated steel sheet during the working steps, and wherein the heat treatment step includes the step of heating the laminated steel sheet to a temperature in a range from the glass transition point of the film of the laminated steel sheet to the melting point thereof +30° C., followed by applying rapid cooling to the laminated steel sheet to a temperature of the glass transition point or below within 30 seconds after the heating, at a stage that the degree of working is in a range of $0.2 \leq d/R \leq 0.5$ and of $1.5 \leq h/(R-r) \leq 2.5$, $$1.5 \leq h/(R-r) \tag{1}$$

$$d/R \leq 0.25 \tag{2}$$

where, h is the height from the can bottom to the tip of the opening, R is the circular blank positioning radius, r is the radius of the can bottom, and d is the radius of the tip of the opening.

3. The method for forming two-piece can according to 1 or 2, further having the step of trimming the opening of the can body to form a new opening end, after the step of applying diametral reduction to the opening of the can body.

4. The method for forming two-piece can according to 1 or 2, wherein the laminated steel sheet is a steel sheet laminated by a polyester resin.

5. The method for forming two-piece can according to 4, wherein the polyester resin is prepared by polycondensation of a dicarboxylic acid component and a diol component, wherein the dicarboxylic acid component contains terephthalic acid as the main ingredient, and the diol component contains at least one of ethylene glycol and butylene glycol as the main ingredient.

6. The method for forming two-piece can according to 5, wherein the organic resin as the laminate of the laminated steel sheet contains a polyester resin as the main phase, and a resin which is incompatible and has 5° C. or lower Tg as the sub-phase. (Note: The glass transition is a phenomenon that a polymer substance changes the glassy hard state to a rubber-like state when it is heated. The temperature of occurrence of the glass transition is called the "glass transition point (Tg)").

7. The method for forming two-piece can according to 6, wherein the resin existing as the sub-phase is a resin selected from the group consisting of: polyethylene, an acid modification thereof, an ionomer thereof, polypropylene, an acid modification thereof, and an ionomer thereof.

8. A two-piece can being formed by the forming method according to any of 1 to 7.

9. A laminated steel sheet for two-piece can, being used for the method for forming two-piece can according to any of 1 to 7. The laminated steel sheet for two-piece can is a laminated steel sheet having the laminate of an organic resin film.

10. A method for forming two-piece can using a laminated steel sheet as a base material, having the steps of: blanking the laminated steel sheet; forming a can body in a shape of cylinder integrated with bottom by applying repeated several cycles of drawing to a circular blank of the laminated steel sheet, obtained by blanking the laminated steel sheet; forming a tapered part extending outward from the can body in the radial direction thereof at the tip of the opening of the can body; applying diametral reduction to the tapered part to the diameter of the can body; and applying diametral reduction to the opening side of the can body to a diameter smaller than the diameter of the can body, while satisfying the formulae (1) and (2), $$1.5 \leq h/(R-r) \quad (1)$$

$$d/R \leq 0.25 \quad (2)$$

where, h is the height from the can bottom to the tip of the opening, R is the circular blank positioning radius, r is the radius of the can bottom, and d is the radius of the tip of the opening.

11. The method for forming two-piece can according to 10, further having the step of trimming to form a new opening end at the tapered part in at least one of the stages of: before the step of applying diametral reduction to the tapered part; and after the step of applying diametral reduction to the tapered part.

12. The method for forming two-piece can according to 10 or 11, further having the step of trimming to form a new opening end at the opening side of the can body after the step of applying diametral reduction to the opening side of the can body.

13. The method for forming two-piece can according to 10, wherein the laminated steel sheet is a steel sheet laminated by a polyester resin.

14. The method for forming two-piece can according to 13, wherein the polyester resin is prepared by polycondensation of a dicarboxylic acid component and a diol component, wherein the dicarboxylic acid component contains terephthalic acid as the main ingredient, and the diol component contains ethylene glycol and/or butylene glycol as the main ingredient.

15. The method for forming two-piece can according to 14, wherein the organic resin as the laminate of the laminated steel sheet contains a polyester resin as the main phase, and a resin which is incompatible and has 5° C. or lower Tg as the sub-phase.

16. The method for forming two-piece can according to 15, wherein the resin existing as the sub-phase is a resin selected from the group consisting of: polyethylene, an acid modification thereof, an ionomer thereof, polypropylene, an acid modification thereof, and an ionomer thereof.

17. A two-piece can being formed by the forming method according to any of 10 to 16.

18. A laminated steel sheet having the laminate of an organic resin film, being used for the method for forming two-piece can according to any of 10 to 16.

19. The method according to any of 1, 2, and 10, wherein the forming method of two-piece can made of the laminated steel sheet includes ironing adding to the deep drawing.

20. The method according to any of 1, 2, and 10, wherein the number of drawing cycles for forming the two-piece can of the laminated steel sheet is preferably 10 or less.

21. The method according to any of 1, 2, and 10, wherein the drawing rate on forming the two-piece can of the laminated steel sheet is preferably 0.4 or more for the first drawing cycle on the circular blank, and 0.5 or more for succeeding drawing (re-drawing) cycles.

22. The method according to any of 1, 2, and 10, wherein, on applying drawing to the laminated steel sheet, the average sheet thickness change rate is preferably in a range of $0.5 < t/t_0 < 1.5$, where t is the average sheet thickness over the entire sheet thickness of side wall of the can body, and to is the original sheet thickness.

23. The method according to any of 1, 2, and 10, wherein the degree of working on applying diametral reduction to the opening end of the two-piece can of the laminated steel sheet is preferably in a range of $d/r > 0.3$ and, more preferably, in a range of $d/r > 0.4$, where r is the radius of can body, and d is the radius of opening end after the diametral reduction.

24. The method according to any of 1, 2, and 10, wherein the steel sheet becoming the substrate of the laminated steel sheet contains at least one of the following:
   (1) a steel sheet of a low carbon steel of approximate range from 0.01 to 0.10% C, being prepared by recrystallization annealing by box annealing;
   (2) a steel sheet of a low carbon steel of approximate range from 0.01 to 0.10% C, being prepared by recrystallization annealing by continuous annealing;
   (3) a steel sheet of a low carbon steel of approximate range from 0.01 to 0.10% C, being prepared by recrystallization annealing by continuous annealing, followed by over-aging;
   (4) a steel sheet of a low carbon steel of approximate range from 0.01 to 0.10% C, being prepared by recrystallization annealing by box annealing or continuous annealing, followed by secondary cold-rolling (cold-rolling after annealing); and (5) an IF steel (interstitial free steel) of a very low carbon steel of approximate range of 0.003% or less C with the addition of a solid-solution C-fixing element, prepared by recrystallization annealing by continuous annealing.

25. The method according to any of 1, 2, and 10, wherein the method for applying diametral reduction to the laminated steel sheet is at least one of the die-curling method and the spinning method.

DETAILED DESCRIPTION

Figure 1:
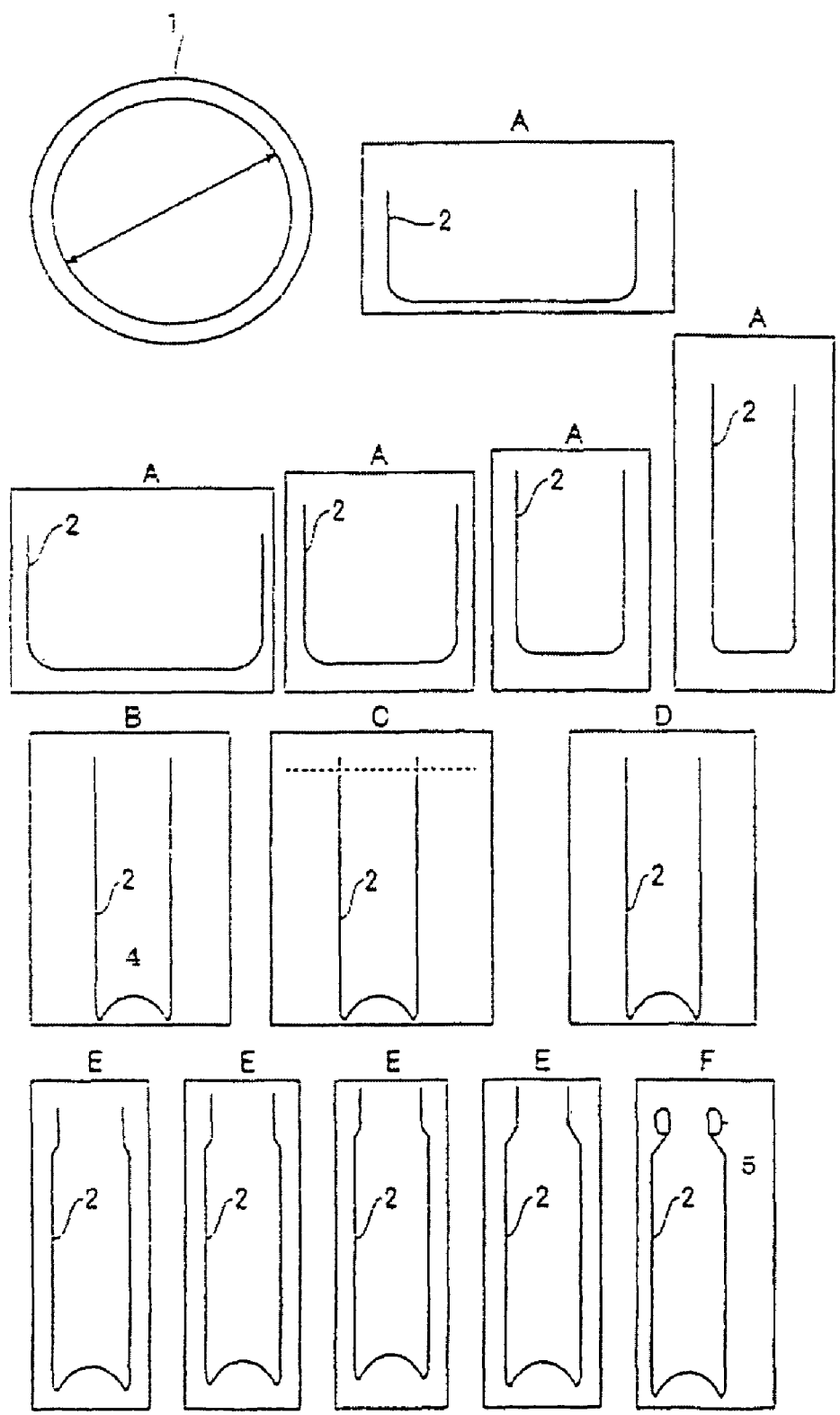
FIG. 1 illustrates a process for manufacturing a two-piece can (no trimming is applied after the diametral reduction to a diameter smaller than the diameter of the cylinder).

The two-piece can and the method for forming thereof, and the steel sheet for a two-piece can are described in detail in the following.

The description begins with the laminated steel sheet used as the base material.

We obtain a two-piece can which has sufficient corrosion resistance and strength as the can, and which is manufactured at a low cost. The base material for forming the two-piece can adopt a laminated steel sheet having the laminate of an organic resin film which has high workability and high corrosion resistance.

Although the steel sheet as the substrate of the laminated steel sheet is arbitrary if only the sheet can be formed into a target shape, preferable ones have the compositions given bellow and are manufactured by the methods given below:

(1) a steel sheet of a low carbon steel of approximate range from 0.01 to 0.10% C, being prepared by recrystallization annealing by box annealing;

(2) a steel sheet of a low carbon steel of approximate range for 0.01 to 0.10% C, being prepared by recrystallization annealing by continuous annealing;

(3) a steel sheet of a low carbon steel of approximate range from 0.01 to 0.10% C, being prepared by recrystallization annealing by continuous annealing, followed by over-aging;

(4) a steel sheet of a low carbon steel of approximate range from 0.01 to 0.10% C, being prepared by recrystallization annealing by box annealing or continuous annealing, followed by secondary cold-rolling (cold-rolling after annealing); and (5) an IF steel (interstitial free steel) of a very low carbon steel of approximate range of 0.003% or less C with the addition of a powerful solid-solution C-fixing element such as Nb and Ti, prepared by recrystallization annealing by continuous annealing.

The mechanical characteristics of the steel sheet are not specifically limited if only the steel sheet can be formed into a target shape. To maintain sufficient can strength while not deteriorating the workability, however, the yield strength (YS) is preferably in an approximate range from 220 to 580 MPa. Also for the r value which is an index of plastic anisotropy, 0.8 or higher value is preferred, and the planar anisotropy $\Delta r$ of the plastic anisotropy r value is preferably 0.7 or less of the absolute value. The thickness of the steel sheet can be adequately selected depending on the shape of the target can and the necessary can strength. From the point to suppress the cost increase in the steel sheet and in the can, the sheet thickness is preferably in an approximate range from 0.15 to 0.4 mm.

The steel sheet preferably adopts a surface-treated steel sheet using various types of surface treatments. In particular, an optimum one is the surface-treated steel sheet, forming double layer films, namely metallic chromium at lower layer and chromium hydroxide at upper layer, (what is called the "TFS"). Although the coating weight of the metal chromium layer and the chromium hydroxide layer for the TFS is not specifically limited, it is preferable to select the range from 70 to 200 mg/m$^2$ as Cr for the metal chromium layer, and from 10 to 30 mg/cm$^2$ as Cr for the chromium hydroxide layer.

The organic resin film laminating the steel sheet is the following.

The organic resin film structuring the laminated steel sheet is preferably the following to eliminate the possibility of damaging the film during working step as far as possible.

For example, a more preferable organic resin is polyester owing to the superior balance of elongation characteristic and strength characteristic, which balance is necessary for working. Preferable polyester resins include the one prepared by polycondensation of carboxylic acid component and diol component, wherein the dicarboxylic acid component contains terephthalic acid as the main ingredient, and the diol component contains ethylene glycol and/or butylene glycol as the main ingredient. When the terephthalic acid is the main ingredient of the dicarboxylic acid component, isophthalic acid ingredient may be added as other copolymerizing ingredient. For the diol component, when ethylene glycol and/or butylene glycol is the main ingredient, diethylene glycol and cyclohexane diol may be added as other copolymerizing ingredient. Furthermore, while using that type of polyester resin as the main phase, a resin which is incompatible and has 5° C. or lower Tg may be added as the sub-phase. In that case, the sub-phase preferably selects at least one of polyethylene, polypropylene, and/or an acid modification thereof, and an ionomer thereof.

An additive such as pigment, lubricant, and stabilizer may be added to the resin composition specified and, adding to the resin layer specified, a resin layer having other functions may be placed as upper layer or interim layer.

The method for laminating the steel sheet is not specifically limited, and an adequate method can be selected, such as thermocompression bonding process for thermocompression of biaxially oriented film or non-oriented film, and extrusion process which uses a T-die or the like to directly form the resin layer on the steel sheet. Those processes were confirmed to give sufficient effect.

The two-piece can is formed by the steps of: using the laminated steel sheet as the base material; drawing a circular blank for several times to form a can body in a shape of a cylinder integrated with a bottom; forming a tapered part extending outward from the can body in the radial direction thereof at the tip of the opening of the can body; applying diametral reduction to the tapered part to the diameter of the can body; and applying diametral reduction to the opening end of the can body to a diameter smaller than the diameter of the can body, while satisfying the formulae (1) and (2). Particularly, the characteristics are to form the tapered part during drawing and to apply diametral reduction to the tapered part to a diameter smaller than the diameter of the can body, $$1.5 \leq h/(R-r) \quad (1)$$

$$d/R \leq 0.25 \quad (2)$$

where h is the height from the can bottom to the tip of the opening, R is the circular blank positional radius, r is the radius of the can bottom, and d is the radius of the tip of the opening.

The forming method is described in detail in the following.

To form a can body in a shape of a cylinder integrated with a bottom from a base material of laminated steel sheet, a suitable method is the one to apply repeated several cycles of drawing to a circular blank, thus to obtain a desired height. The number of drawing cycles and the drawing rate in the pluralities of drawing works can be adequately selected. To simplify the forming process, a small number of drawing cycles is preferred. To do this, however, low drawing rate, or severe working, is required. For simplifying the forming process, 10 or smaller number of drawing cycles is preferred. A preferable drawing rate is 0.4 or more for the first drawing cycle of the circular blank, and 0.5 or more for succeeding drawing (redrawing) cycles.

The drawing basically adopts pluralities of drawing cycles. There may be adopted a method adding the ironing, or drawing-ironing working. In the pluralities of drawing cycles, there can be adopted a wall-thinning drawing which decreases the sheet thickness utilizing the bending and unbending deforming at the drawing die shoulder in a state of applying back-tension under the blank-holding force, a wall-thinning drawing and ironing working which adds the ironing to the above working, and the like. (Note: The term "ironing" is the work of, aiming to obtain a deep product by further thinning the formed cylindrical article prepared by deep-drawing, ironing the side wall of the non-deep-drawn formed article in the height direction.)

Drawing is affected by lubrication condition. For the laminated steel sheet, the laminate film is soft and has smooth surface so that the film itself functions to increase the lubricant property. Therefore, the drawing does not need special lubricant. For the case of low drawing rate, however, a lubricant is preferably adopted. The kind of lubricant is adequately selected.

During the drawing, the sheet thickness of the side wall of the can body varies from the original sheet thickness. When the variation of sheet thickness is expressed by an average sheet thickness change rate $t/t_0$, (t is the average sheet thickness over entire can height, and to is the original sheet thickness), the drawing-redrawing work likely gives $t/t_0>1$, while the drawing-ironing, the wall-thickness thinning-drawing, the wall-thickness thinning-ironing, and the like tend to give $t/t_0<1$. When the damage of laminated steel sheet during working is considered, the average sheet thickness change rate is preferably regulated in a range of $0.5<t/t_0<1.5$.

With the above procedure, the two-piece can using the laminated steel sheet as the base material is formed. The forming method is described below for the respective embodiments.

First Embodiment

Step of Forming a Dome Inside the Can at Can Bottom

When the two-piece can of the First Embodiment is used as an aerosol can, the can needs to have 15 kgf/cm² or higher pressure strength for filling a propellant. To the pressure increase in the can, special care is required to the can bottom. The internal pressure of the can body in a shape of a cylinder integrated with a bottom induces a stress on the side wall of the can body to stretch the can body in the circumferential direction. The member of the can body, however, has already become fully work-hardened by the drawing, thus the can body does not deform under the internal pressure. Since the can bottom is subjected to internal pressure in a state that the outer periphery is restricted by the can body, when the internal pressure is high, the can bottom deforms toward outside the can. To suppress the deformation of the can bottom under internal pressure, the First Embodiment forms a dome inside the can at can bottom in a shape protruding inside of the can. The thus formed dome at the can bottom allows increasing the sheet thickness at the can bottom and increasing the member strength.

Step of Diametral Reduction at Opening Side of the Can Body

In an aerosol can, for example, in order to attach the mounting cap to the opening of the can body, the opening end has to be worked by diametral reduction to a diameter smaller than the diameter of the can body. The degree of working of the diametral reduction may be the one for attaining a specific diameter necessary to attach the mounting cap. From the point of eliminating the damage of film as far as possible, however, the relation between the radius r of can body and the radius d of opening end after diametral reduction is preferably $d/r>0.3$ and, more preferably, $d/r>0.4$. Applicable methods of diametral reduction include the die-neck method which conducts diametral reduction by pressing the opening end against a die in internal-taper shape, and the pin-neck method which conducts diametral reduction by pressing a rotary tool against the opening end of the can body in the inward radial direction of the can body. From the viewpoint of eliminating the film damage as far as possible, the die-neck method is suitable. As for the die-neck method, it is preferable that the working is given in several stages between the radius r of the can body and the radius d thereof after the final diametral reduction. If the degree of working per stage is large, the possibility of generating wrinkles during the diametral reduction increases. Therefore, the diametral reduction rate, (the diameter after diametral reduction/the diameter before diametral reduction), is preferably regulated to 0.9 or more. Since the film as the laminate of the laminated steel sheet is soft and has smooth surface, the film itself functions to increase the lubricant property. Consequently, the diametral reduction does not need special lubricant. However, from the point to eliminate the film damage caused by the sliding with tool, as far as possible, a lubricant is preferably applied. The type of lubricant is adequately selected.

The forming is requested for the degree of working after diametral reduction to satisfy the formulae (1) and (2), $$1.5 \leq h/(R-r) \quad (1)$$

$$d/R \leq 0.25 \quad (2)$$

where h is the height from the can bottom to the tip of the opening, R is the circular blank positioning radius, r is the radius of the can bottom, and d is the radius of the tip of the opening.

Figure 3:
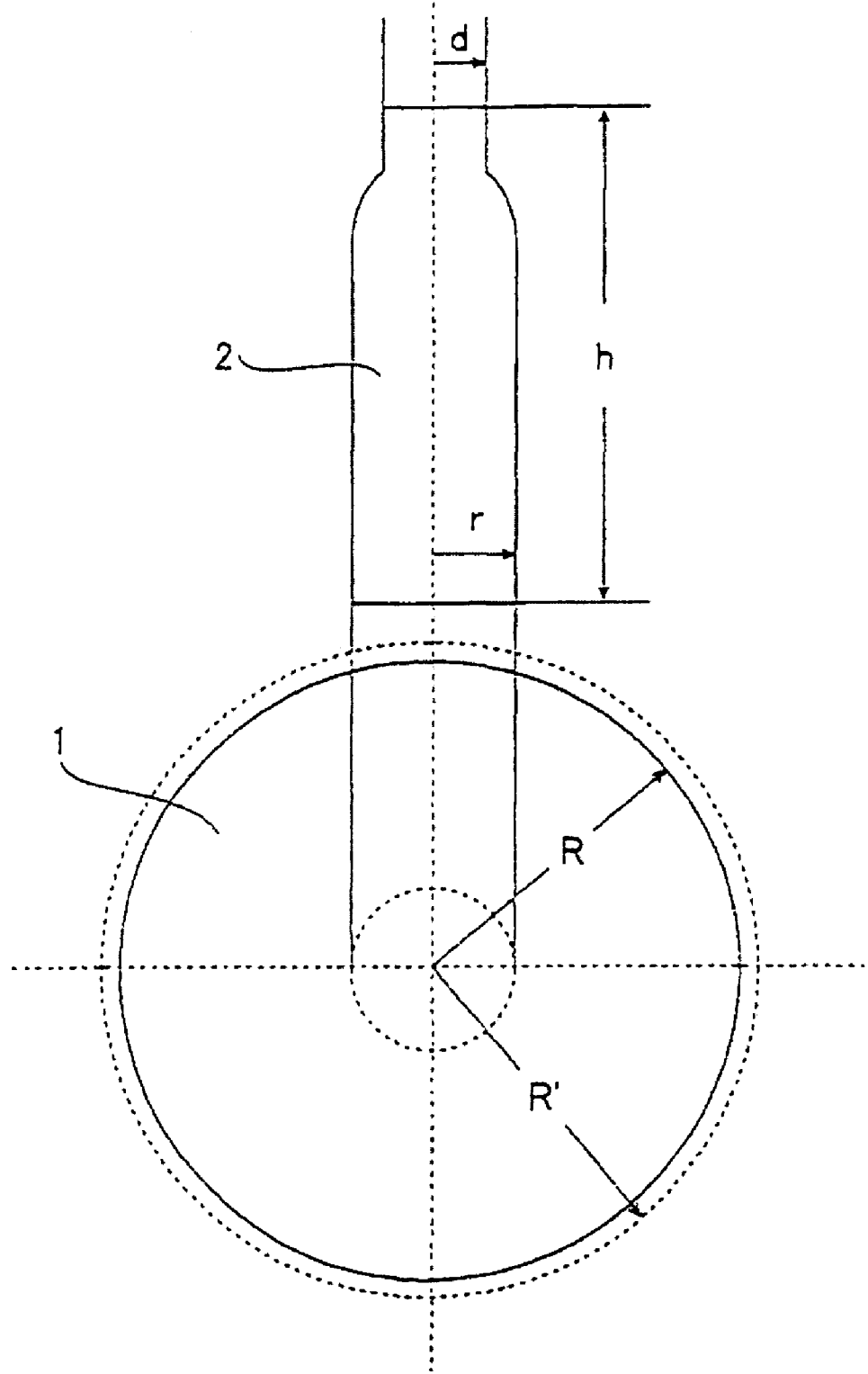
FIG. 3 shows the relation of dimensions of one of our cans.

First, the relation among the height h up to the opening end, the bottom radius r, and the circular blank positional radius R is specified to $1.5 \leq h/(R-r)$. FIG. 3 shows the relation of dimensions of the can, giving the circular blank 1 and the can body 2. The symbols h, R, d and r are those described above. The symbol R' is the original blank radius before trimming.

On actual drawing, the drawing is conducted from a circular blank having an original blank radius R' larger than the circular blank positional radius R specified. The member between R and R' is eliminated by the trimming. The term (h/(R−r)) is an index representing average elongation of the laminated steel sheet in the can height direction before and after the forming.

Then, the relation between the radius d at the tip of the opening and the circular blank positional radius R is specified to d/R≦0.25. This is an index representing the reduction of the laminated steel sheet in the can circumferential direction at the opening end before and after the forming.

As described before, for forming a can body in a shape of a cylinder integrated with a bottom from the base material of laminated steel sheet, the method of applying pluralities of drawing cycles to the circular blank to obtain a specified height is suitable. In that case, to obtain the shape of aerosol can described in Federation of European Aerosol Association Standard Nos. 215, 219 and 220, and to avoid the damage of laminated steel sheet during working, the average sheet thickness change rate is regulated to $0.5<t/t_0\leq1.5$. Then, it is required to establish the relation of 1.5≦h/(R−r) and d/R≦0.25.

Step of Trimming Before or Before and after Diametral Reduction

Figure 4:
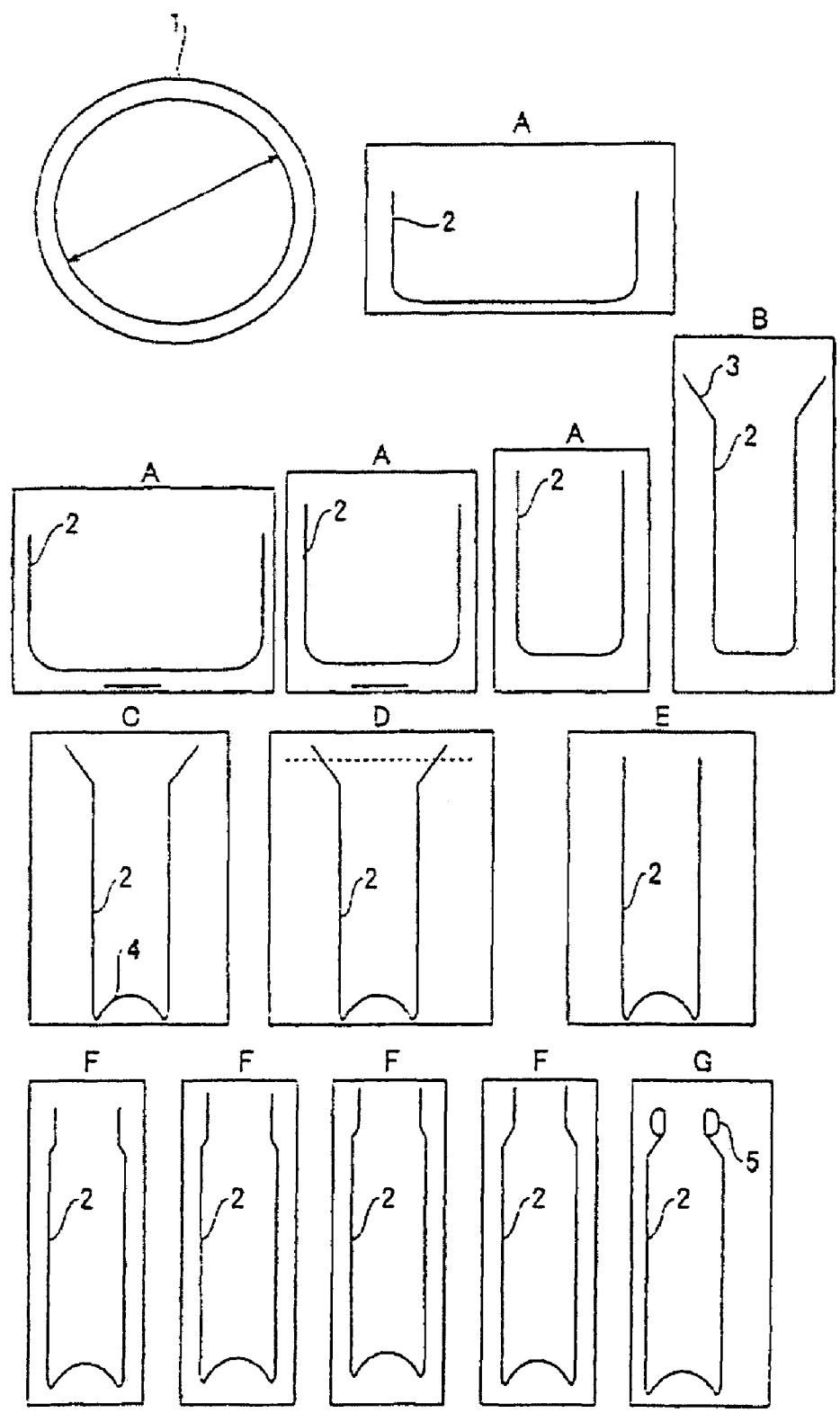
FIG. 4 illustrates another process for manufacturing a two-piece can (no trimming is applied after the diametral reduction to a diameter smaller than the diameter of the cylinder).

According to the First Embodiment, it is preferable to apply trimming to form a new opening end at the opening of the can body before or before and after the step of applying diametral reduction to the opening of the can body. By applying trimming before or before and after the diametral reduction, the film separation can be avoided. The opening end after drawing deteriorates the adhesion of film owing to the high degree of working, to the sliding during working, and the like, and also there appears physical exposure of the adhered portion between the film and the steel sheet surface. Therefore, the opening end of the can body is the most possible portion of film separation. To this point, by eliminating the end portion by trimming before applying diametral reduction, the possibility of film separation is reduced. On the other hand, since the diametral reduction itself is a working to increase the possibility of film separation at the opening end, the trimming after the diametral reduction can further decrease the possibility of film separation in the succeeding working steps. If the trimming is given at both before and after the diametral reduction, better state can be attained. Applicable methods for trimming include the one using an inner cutting edge in solid cylindrical shape (inserting inside the can body) and an outer cutting edge in disk shape having sharp edges, mutually rotating. FIG. 2 illustrates a process for manufacturing a two-piece can (trimming is applied after the diametral reduction to a diameter smaller than the diameter of the cylinder). FIG. 4 illustrates another process for manufacturing a two-piece can (no trimming is applied after the diametral reduction to a diameter smaller than the diameter of the cylinder). The broken line indicates the level of trimming. The reference symbols are the same to those in FIGS. 1 and 2.

Step for Forming Bead

For the case of using the two-piece can as an aerosol can, a mounting cap (equipped with an ejection valve to eject an adequate quantity of the contents) is attached to the opening end. To do this, a bead having a structure to attach the mounting cap to the opening end is formed. The shape and the forming method of the bead are not specifically limited if only the bead allows the mounting cap to clinch to fix to the can, and if only the bead has a shape to allow the mounting cap to clinch and fix to the can and to fully perform the functions as the bead.

The above procedure forms the two-piece can of the First Embodiment. If necessary, however, heat treatment and other working can be given in the course of working process described below.

Step of Heat Treatment During Working Process

The First Embodiment applies heat treatment to further decrease the possibility of film damage. Specifically, in a stage of degree of working of 0.2≦d/R≦0.5 and 1.5≦h/(R−r)≦2.5, heating is applied to a temperature in a range from the glass transition point of the film of the laminated steel sheet to the melting point thereof +30° C., and then rapid cooling is applied to a temperature of at or below the glass transition point thereof within 30 seconds. The procedure is a characteristic and an important element of the First Embodiment. That is, by heating to a temperature ranging from the glass transition point to the melting point +30° C., the stress accompanied with the strain applied to the film during the working is relaxed, and the possibility of film separation in succeeding workings is decreased. The minimum temperature to make the relaxation of internal stress possible is set to the glass transition point. A temperature below the glass transition point is not preferable because the crystallization is enhanced and the succeeding workability is deteriorated. Regarding the reason to setup the timing of heat treatment as above, the lower limit is determined considering the production efficiency. That is, a stage below the lower limit is the one giving relatively small internal stress that is accumulated in the film, which lowers the effect of the heat treatment. As a result, even when the heat treatment is given at the stage below the lower limit, the succeeding working accumulates the internal stress, thus resulting in film separation in some cases. Inversely, the heat treatment in a stage above the upper limit may become the heat treatment after the separation occurred, which is a delayed timing for the heat treatment, and which is difficult to attain the effect of heat treatment. In particular, when fine separations exist, even if visual observation cannot find, separation may propagate from the fine separations as the origin in a step after the heat treatment. Consequently, the heat treatment is necessary to be given at a degree of working at or below the upper limit. Therefore, the upper limit of the heat treatment temperature is determined to the melting point +30° C., preferably the melting point +20° C., considering the deterioration of resin by thermal decomposition. Within the range, the resin deterioration by thermal decomposition occurs very little. Further preferably, for the polyester film specified, the heat treatment temperature is specified to a range from 150° C. to the melting point +20° C. When a polyester resin is used as the resin as the laminate of the laminated steel sheet according to the First Embodiment, a preferred lower limit of the heat treatment temperature is 150° C. The temperature is the lower limit of the temperature allowing short time of treatment for the relaxation of internal stress. That is, if the temperature is at or above the glass transition point, the relaxation of internal stress can be attained. If, however, the temperature is 150° C. or above, the treatment within a short time is attained. Furthermore, if the rapid cooling is applied within 30 seconds after the heat treatment, preferably within 10 seconds thereafter, to a temperature of at or below the glass transition point of the film, the internal stress is relaxed. At or above the glass transition point and at or below the melting point, the crystallization of resin proceeds, and the workability deteriorates. Therefore, rapid cooling within a short time to at or below the glass transition point is required, thus the above process is adopted. The method of heat treatment is not specifically limited, and it was confirmed that electric furnace, gas-oven, infrared furnace, induction heater, and the like give similar effect. The heating rate and the heating time are adequately selected depending on the effect. However, higher heating rate gives higher efficiency. Although an adequate range of the heating time is approximately from 15 to 60 seconds, the time is not necessarily limited to the range, and an adequate time is selected depending on the effect.

The above procedure forms the two-piece can of the First Embodiment. If necessary, however, working processes described below can be given.

Step of Forming the Tapered Part and Step of Applying Diametral Reduction

When a circular blank is treated by drawing to form a can body in a shape of a cylinder integrated with a bottom, there may occur a phenomenon of separation of the film laminated at the opening end. Presumable reasons of the phenomenon are that the forming is given so as the diameter of the can body to maintain a constant value in the height direction, thus the forming of the opening end proceeds in a state of sliding while being clamped between the drawing die and the blank holder, which likely induces damage of film on the surface of the steel sheet, and that the opening end is always subjected to a blank holding force during the working, which induces a force against the steel sheet and the film in the direction of can height, thereby increasing the degree of working in the can height direction. To solve the problem, it is preferable that a tapered part is formed at the tip of the opening of the can body extending outward from the can body in the radius direction thereof, followed by applying diametral reduction to the tapered part to the diameter of the can body, and to form the can body so as the diameter of the can body to maintain a constant value in the can height direction. As described above, the forming of the tapered part and the applying of diametral reduction before the final drawing allow the forming of opening end without inducing sliding, in a state that the opening end is clamped between the drawing die and the blank holder.

The forming method specified in the First Embodiment is not limited to the case of laminated steel sheet as the can material but also applicable to the cases of other base materials.

Example 1-1

Figure 2:
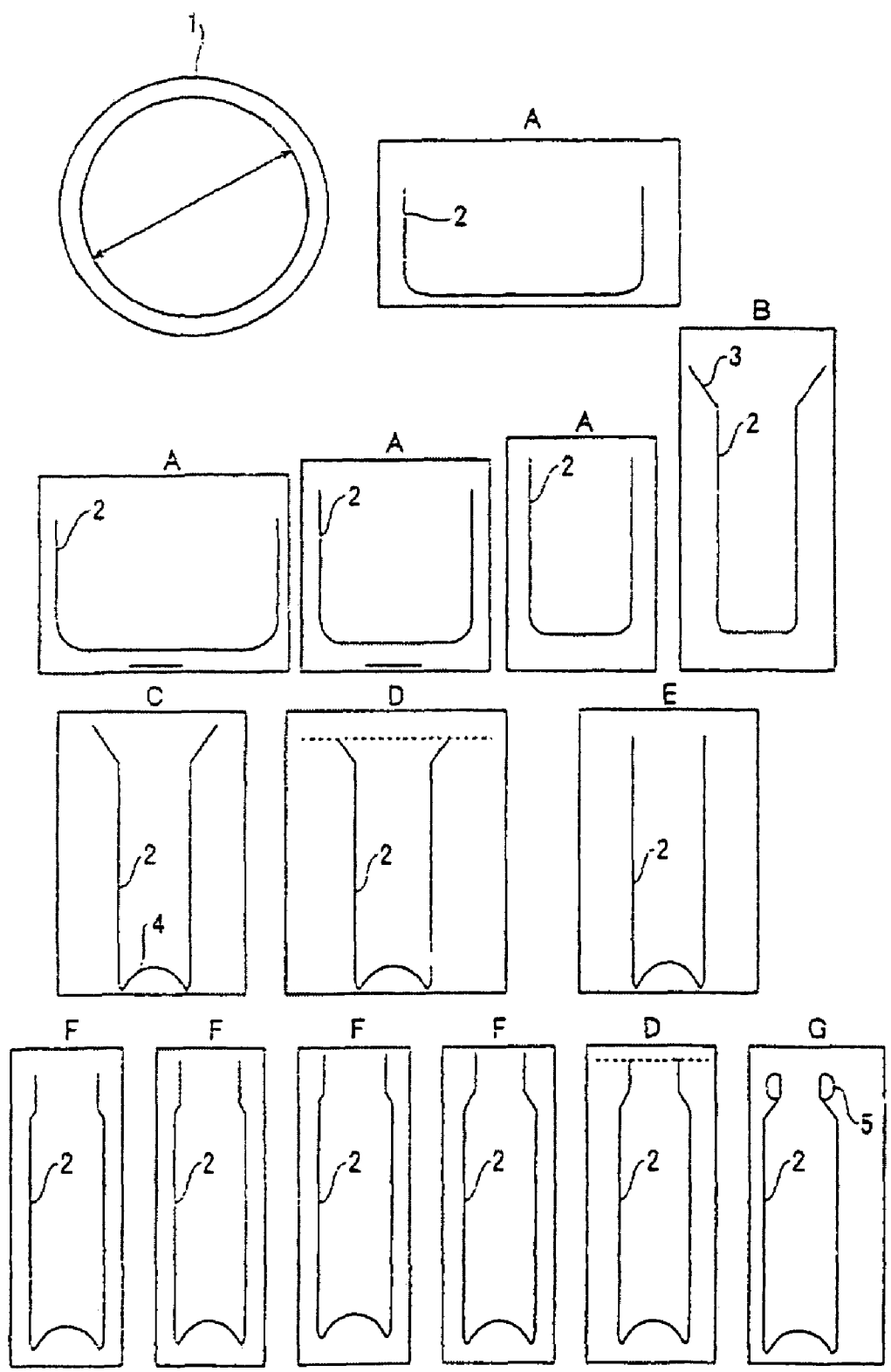
FIG. 2 illustrates a process for manufacturing a two-piece can (trimming is applied after the diametral reduction to at a diameter smaller than the diameter of the cylinder).

FIG. 1 illustrates a process for manufacturing a two-piece can according to the First Embodiment. In FIG. 1, the reference symbol 1 designates the circular blank, the symbol 2 designates the can body, the symbol 4 designates the dome-shaped part, and the symbol 5 designates the bead. The reference symbol A designates the step of drawing and ironing, the symbol B designates the step of drawing accompanied with the tapered part forming, the symbol C designates the step of dome-shape working at can bottom, the symbol D designates the step of trimming, the symbol E designates the step of applying diametral reduction at the tapered part, the symbol F designates the step of applying diametral reduction to a diameter smaller than the diameter of the can body. Detail conditions of the step of drawing are given in Table 1, detail conditions of the diametral reduction to a diameter smaller than the diameter of the can body are given in Table 2, and the average elongation of the aerosol can in the can height direction after the diametral reduction, and the shrinkage of the laminated steel sheet at the tip of the opening in the circumferential direction of the can before and after the forming are given in Table 3. The condition of heat treatment is given in Table 4.

TABLE 1

| Number of working stage | Drawing rate | r/R | h − (R − r) |
|---|---|---|---|
| 1 | 0.55 | 0.59 | 1.35 |
| 2 | 0.80 | 0.47 | 1.53 |
| 3 | 0.83 | 0.39 | 1.78 |
| 4 | 0.83 | 0.32 | 1.76 |
| 5 | 0.83 | 0.27 | 1.89 |

TABLE 2

| Number of working stage | Diametral reduction rate |
|---|---|
| 1 | 0.960 |
| 2 | 0.957 |
| 3 | 0.960 |
| 4 | 0.958 |
| 5 | 0.960 |
| 6 | 0.961 |
| 7 | 0.959 |
| 8 | 0.949 |

TABLE 3

| Can | d/R | h/(R − r) | Sheet thickness change rate | Blank diameter (mm) | |
|---|---|---|---|---|---|
| A | 0.19 | 2.24 | 1.20 | 80.6 | Example |
| B | 0.17 | 1.85 | 1.45 | 93.1 | Example |
| C | 0.22 | 2.77 | 0.75 | 69.5 | Example |
| D | 0.24 | 3.10 | 0.65 | 64.4 | Example |

* The given blank diameter is a converted blank diameter after the trimming.

Based on FIG. 1, Tables 1 to 3, and Table 4 given below, a two-piece aerosol can was manufactured by the following procedure:

(1) Blanking

Blanking was given to steel sheets, prepared from original sheet of TFS, of low carbon cold-rolled steel sheets having each 0.17 to 0.24 mm in sheet thickness, laminated by a polyethylene terephthalate film on both sides thereof by thermofusion method. The range of blank diameter was from 64 to 94 mm.

(2) Drawing and Ironing

Drawing (5 stage) formed the products of r/R in a range from 0.27 to 0.59, and h/(R−r) in a range from 1.35 to 1.89. To manufacture a desired can, ironing was applied as needed. The values of h/(R−r) and r/R after drawing are given in Table 2. The symbols h, r, and R in Table 2 designate the height to the opening end in the state of diametral reduction after drawing, the radius of the cylinder integrated with the bottom, and the circular blank positioning radius, respectively.

(3) Dome-Shape Working at Can Bottom

At the can bottom, stretch forming of half-spherical shape with 6 mm in depth was applied.

(4) Diametral Reduction at Tapered Part

The tapered part was treated by diametral reduction to the diameter of the can body.

(5) Trimming

The trimming was given by press-method using an outer cutting edge having a circular hole and an inner cutting edge in cylindrical shape, giving about 1 mm of trimming at the upper end of the can.

(6) Diametral Reduction to a Diameter Smaller than the Diameter of Can Body

To the opening side of the can body, the diametral reduction was applied, and there were obtained the final can shapes of h/(R−r) in a range from 1.85 to 3.1, and d/R in a range from 0.17 to 0.24. In detail, the die-neck method was applied pressing the opening end against the die in inside-tapered shape to conduct diametral reduction. For the working from the can body diameter to the final drawn diameter, multistage forming was applied depending on the degree of working. The value of d/R and h/(R−r) of the can manufactured by the working are given in Table 3.

On thus obtained cans for testing, the presence/absence of film separation was inspected. The inspection of presence/absence of film separation was given visually for evaluation at the working step. The result is given in Table 4 together with the condition of heat treatment.

TABLE 4

| Can | Degree of working in heat treatment | | Condition of heat treatment | Film separation | |
|---|---|---|---|---|---|
| | d/R | h/(R − r) | | | |
| A-1 | 0.38 | 1.78 | 220° C. - 30 sec. | None | Example |
| A-2 | 0.47 | 1.53 | 220° C. - 30 sec. | None | Example |
| B-1 | 0.31 | 1.7 | 220° C. - 30 sec. | None | Example |
| B-2 | 0.31 | 1.7 | 220° C. - 30 sec. | None | Example |
| C-1 | 0.5 | 2.3 | 220° C. - 30 sec. | None | Example |
| C-2 | 0.3 | 2.7 | 220° C. - 30 sec. | None | Example |
| D-1 | 0.4 | 2.8 | 220° C. - 30 sec. | None | Example |
| D-2 | 0.35 | 2.9 | 220° C. - 30 sec. | None | Example |
| A-3 | | | None | Occurred | Comparative Example |
| B-3 | | | None | Occurred | Comparative Example |
| C-3 | | | None | Occurred | Comparative Example |
| D-3 | | | None | Occurred | Comparative Example |

As seen in Table 4, Examples of the First Embodiment, subjected to heat treatment in the working process, did not show film separation. On the other hand, Comparative Examples which did not apply heat treatment generated film separation, and resulted in exposure of the steel.

The two-piece can of the First Embodiment is most suitable for the two-piece aerosol can owing to the superior performance. Other than the two-piece aerosol can, the two-piece can of the First Embodiment is suitable for the uses which request the can strength, the corrosion resistance, the appearance, and the low manufacturing cost.

Second Embodiment

Step of Forming the Tapered Part and Step of Applying Diametral Reduction

Forming the tapered part is the most important element of the Second Embodiment. The procedure that a circular blank is treated by drawing to form a can body in a shape of cylinder integrated with bottom is, as disclosed in Japanese Patent Laid-Open No. 63-168238 for example, normally forming the cylinder so as the diameter thereof to become constant in the height direction, followed by diametral reduction to a diameter smaller than the diameter of the cylinder. When, however, the laminated steel sheet is formed to a shape targeted by the Second Embodiment, the method induces a phenomenon of separation of the laminate film at the opening end. Presumable reasons of the phenomenon are that the forming is given so as the diameter of the can body to maintain a constant value in the height direction, thus the forming of the opening end proceeds in a state of sliding while being clamped between the drawing die and the blank holder, which likely induces damage of film on the surface of the steel sheet, and that the opening end is always subjected to a blank holding force during the working, which induces a force against the steel sheet and the film in the direction of can height, thereby increasing the degree of working in the can height direction. To solve the problem, it is necessary that the forming is conducted without inducing sliding, in a state that the opening end is clamped between the drawing die and the blank holder. Our investigations solved the problem of separation of the laminate film at the opening end by the steps of: forming the tapered part at the tip of the opening of the can body extending outward from the can body in the radial direction thereof before the final drawing; and applying diametral reduction to the tapered part to the diameter of the can body, while keeping the diameter of the can body constant in the can height direction. According to the method, the opening end is not slid in a state that the opening end is clamped between the drawing die and the blank holder, and there is no generation of force in the can height direction caused by the blank holding force.

A preferred method for forming the tapered part is the one using a drawing die in an inside-tapered shape, and a blank holder having a tapered tip for drawing. The tapered part is only required to be formed before the final drawing step, and alternatively the tapered part is formed in a step before the final drawing step, followed by applying drawing in the succeeding drawing step to maintain the tapered part. In the latter case, if the drawing rate in the final drawing step is set to a large level, using only the drawing die in an inside-tapered shape, and if the drawing is given by a method not using the blank holder, the possibility of damaging the film caused by the blank holder is minimized.

A preferred shape of the tapered part is the one having the inclination angle $\theta$ on the tapered face at inside of the can body to the central axis of the can body of: $20° \leqq \theta \leqq 70°$. If the angle is $\theta < 20°$, wrinkles likely appear at the tapered part during the forming of the tapered part by the above method. If the angle is $\theta > 70°$, wrinkles likely appear at the tapered part during the succeeding diametral reduction of the tapered part to the diameter of the can body. The degree of extension of the tapered part outward from the can body in the radius direction thereof is preferably set to $1.2 \leq dt/r \leq 2.5$, (dt is the radius of the extended part, and r is the radius of the can body). If $dt/r<1.2$, the effect of forming the tapered part cannot be attained. If $dt/r>2.5$, wrinkles likely appear at the tapered part during the succeeding diametral reduction to the diameter of the can body. The method for forming the tapered part by extending the diameter is not preferable because the laminated steel sheet is subjected to excessive working. By the succeeding diametral reduction to the diameter of the cylinder integrated with bottom, the tapered part is formed so as the diameter of the cylinder to become constant in the height direction.

Step of Trimming the Tapered Part

According to the Second Embodiment, the tapered part is preferably trimmed before and/or after the diametral reduction of the tapered part. By trimming the tapered part, the possibility of film separation can further be avoided. That is, the opening end which becomes the outer periphery of the tapered part is subjected to high degree of working, and the adhesion of film deteriorates caused by sliding during working and the like, and also there occurs physical exposure of the adhered portion between the film and the steel sheet surface. Therefore, the opening end of the can body is the most possible portion of film separation. To this portion, by eliminating the end portion by trimming before applying diametral reduction, the possibility of film separation is reduced. On the other hand, since the diametral reduction itself is a working to increase the possibility of film separation at the opening end, the trimming after the diametral reduction can further decrease the possibility of film separation in the succeeding working steps. If the trimming is given at both before and after the diametral reduction of the target part, better state can be attained.

Applicable methods for trimming include the press-trimming method using an outer cutting edge having a circular hole and an inner cutting edge in cylindrical shape, and the method using an inner cutting edge in solid cylindrical shape (inserting inside the can body) and an outer cutting edge in disk shape having sharp edges, mutually rotating. For the trimming of the tapered part before the step of diametral reduction of the tapered part to the diameter of the can body, any of above methods can be applied. For the trimming after the step of applying diametral reduction to the tapered part to the diameter of the can body, the latter method is preferred.

For the (Diametral reduction of the opening side of the can body), the same to that of the First Embodiment is applied.

Step of Trimming after Diametral Reduction

Diametral reduction of the opening side of the can body in a shape of cylinder integrated with bottom to a diameter smaller than the diameter of the can body increases the possibility of film separation because the material is compressed in the circumferential direction. Therefore, it is effective to cut off the opening end by trimming. At the opening end after the diametral reduction, a bead is formed to receive the ejection valve. The bead working is conducted by the curl-forming method. If fine irregularities are generated at the opening end, the irregularities may become the origin of cracks during curling work. Also to this point, trimming after the diametral reduction can avoid the defects such as cracks during the bead forming.

For the (Forming the bead), the same to that of the First Embodiment is applied.

The above procedure forms the two-piece can of the Second Embodiment. If necessary, however, heat treatment and other working can be given in the course of working process described below.

Step of Heat Treatment During Working Process

According to the Second Embodiment, additional application of heat treatment during a series of working process is effective as the method to decrease the possibility of film damage. That is, the stress on the film accompanied with the strain given to the film during working is relaxed by heat treatment, thereby decreasing the possibility of film separation during succeeding working steps. A suitable condition of the heat treatment for the purpose is the heat treatment at or above the glass transition point of the film and at or below the melting point +30° C. and, more preferably, for the polyester film, 150° C. or above and melting point +20° C. or below. Furthermore, it is preferable to apply rapid cooling to a temperature below the glass transition point of the film within 30 seconds after the heat treatment, more preferably within 10 seconds. The object of the heat treatment is relaxing the internal stress. Therefore, the heat treatment under the condition to relax the internal stress is required. From the viewpoint, the glass transition point is set up as the minimum temperature allowing relaxing the internal stress, and the value is the lower limit of the specification. In addition, for the polyester resin according to the Second Embodiment, 150° C. is set as the preferable lower limit of the heat treatment temperature. The value is the lower limit of the temperature allowing conducting the treatment in a short time for relaxing the internal stress. That is, at or above the glass transition point, the relaxation of internal stress is obtained, and at or above 150° C., the treatment within a short time is available. The upper limit of the heat treatment temperature is specified considering the deterioration of resin by thermal decomposition. Within a range of the melting point +30° C., preferably the melting point +20° C., the resin deterioration caused by thermal decomposition occurs very little.

The method of heat treatment is not specifically limited, and it was confirmed that electric furnace, gas-oven, infrared furnace, induction heater, and the like give similar effect. The heating rate and the heating time are adequately selected depending on the effect. However, higher heating rate gives higher efficiency. Although an adequate range of the heating time is approximately from 15 to 60 seconds, the time is not necessarily limited to the range, and an adequate time is selected depending on the effect.

Other Working

The aerosol can which is the target of the Second Embodiment is required to have a pressure strength of 15 $kgf/cm^2$ or more to accept filling of propellant. For the pressure increase inside the can, special care shall be paid to the can bottom. The pressure inside the can body in a shape of cylinder integrated with bottom induces a stress on the side wall of the can body to stretch the can body in the circumferential direction. The member of the can body, however, has already become fully work-hardened by the drawing, thus the can body does not deform under the internal pressure. The portion which needs to consider the effect of the internal pressure is the can bottom. Since the can bottom is subjected to internal pressure in a state that the outer periphery is restricted by the can body, when the internal pressure is high, the can bottom deforms outward from the can. To suppress the deformation of the can bottom under internal pressure, it is effective to increase the sheet thickness at the can bottom and to increase the strength of member, and further it is suitable to form the can bottom in a dome shape protruding inside of the can.

The forming method according to the Second Embodiment is not limited to the case of laminated steel sheet as the can material but also applicable to the cases of other base materials.

Example 2-1

FIG. 4 illustrates a process for manufacturing two-piece can of the Second Embodiment. The reference symbols are the same to those in FIG. 1, and the reference symbol 3 designates the tapered part. The broken line is the level for trimming. Detail conditions of the step of drawing are given in Table 1, detail conditions of the diametral reduction to a diameter smaller than the diameter of the can body are given in Table 2, and the shape of the tapered part in the Second Embodiment is shown in Table 5. Furthermore, the average elongation of the aerosol can after diametral reduction in the direction of can height, and the reduction at the tip of the opening of the laminated steel sheet in the circumferential direction of the can before and after the forming are given in Table 3.

For Table 1, Table 2, and Table 3, refer to the First Embodiment.

TABLE 5

| Presence of taper | θ (°) | dt/r |
|---|---|---|
| Yes | 40 | 1.7 |
| Yes | 10 | 1.7 |
| Yes | 40 | 1 |
| No | — | — |

The two-piece aerosol can was manufactured by the following procedure:

(1) Blanking

Blanking was given to steel sheets, prepared from original TFS, of low carbon cold-rolled steel sheets having each 0.17 to 0.24 mm in sheet thickness, laminated by a polyethylene terephthalate film on both sides thereof by thermofusion method. The range of blank diameter was from 64 to 94 mm.

(2) Drawing and Ironing

Drawing (5 stage) formed the products of r/R in a range from 0.27 to 0.59, and h/(R−r) in a range from 1.35 to 1.89. To manufacture a desired can, ironing was applied as needed. The values of h/(R−r) and r/R after drawing are given in Table 2. The symbols h, r and R in Table 2 designate the height to the opening end in the state of diametral reduction after drawing, the radius of the cylinder integrated with the bottom, and the circular blank positioning radius, respectively. In the drawing, there was applied the forming of tapered part which is an important element of the Second Embodiment. The working method applied was the one using a drawing die in an inside-tapered shape, and a blank holder having a tapered tip for drawing. The shape of the taper is given in Table 5. The reference symbols θ, dt and r in Table 5 are the inclination angle of the tapered face inside the can body to the central axis of the can body, the radius of the extended end, and the radius of the can body, respectively.

(3) Dome-Shape Working at Can Bottom

At the can bottom, stretch forming of half-spherical shape with 6 mm in depth was applied.

(4) Trimming

The trimming was given by press-method using an outer cutting edge having a circular hole and an inner cutting edge in cylindrical shape, giving about 2 mm of trimming at the upper end of the can.

(5) Diametral Reduction at the Tapered Part

The tapered part was treated by diametral reduction to the diameter of the can body.

(6) Diametral Reduction to a Diameter Smaller than the Diameter of Can Body

To the opening side of the can body, the diametral reduction was applied, and there were obtained the final can shapes of h/(R−r) in a range from 1.85 to 3.1, and d/R in a range from 0.17 to 0.24. In detail, the die-neck method was applied pressing the opening end against the die in inside-tapered shape to conduct diametral reduction. For the working from the can body diameter to the final drawn diameter, multistage forming was applied depending on the degree of working. The value of d/R and h/(R−r) of the can manufactured by the working are given in Table 3.

On thus obtained cans for testing, the presence/absence of film separation was inspected. The inspection of presence/absence of film separation was given visually for evaluation at working step. The result is given in Table 6 together with the conditions of heat treatment.

TABLE 6

| | Presence of taper | θ (°) | dt/r | Remark | |
|---|---|---|---|---|---|
| A-1 | Yes | 40 | 1.7 | No film separation occurred. | Example |
| A-2 | Yes | 10 | 1.7 | Wrinkles were generated at tapered part. | Comparative Example |
| A-3 | Yes | 40 | 1 | No taper was formed. | Comparative Example |
| A-4 | No | — | — | Film separation occurred. | Comparative Example |
| B-1 | Yes | 40 | 1.7 | No film separation occurred. | Example |
| B-2 | Yes | 10 | 1.7 | Wrinkles were generated at tapered part. | Comparative Example |
| B-3 | Yes | 40 | 1 | No taper was formed. | Comparative Example |
| B-4 | No | — | — | Film separation occurred. | Comparative Example |
| C-1 | Yes | 40 | 1.7 | No film separation occurred. | Example |
| C-2 | Yes | 10 | 1.7 | Wrinkles were generated at tapered part. | Comparative Example |
| C-3 | Yes | 40 | 1 | No taper was formed. | Comparative Example |
| C-4 | No | — | — | Film separation occurred. | Comparative Example |
| D-1 | Yes | 40 | 1.7 | No film separation occurred. | Example |
| D-2 | Yes | 10 | 1.7 | Wrinkles were generated at tapered | Comparative Example |
| D-3 | Yes | 40 | 1 | No taper was formed. | Comparative Example |
| D-4 | No | — | — | Film separation occurred. | Comparative Example |

As seen in Table 6, Examples of the Second Embodiment, in which tapered part was formed, did not show film separation. On the other hand, Comparative Examples which did not form the tapered part generated film separation, and resulted in exposure of the steel.

Example 2-2

FIG. 2 illustrates another example of the process for manufacturing two-piece can according to the Second Embodiment. The reference symbols are the same to those in FIG. 1 and FIG. 4, and the reference symbol G designates the step of bead working. The broken line is the level for trimming. Detail conditions of the step of drawing, the detail conditions of the diametral reduction to a diameter smaller than the diameter of the can body, the shape of the tapered part in the Second Embodiment, the average elongation of the aerosol can after diametral reduction in the direction of can height, and the reduction at the tip of the opening in the circumferential direction of the can of the laminated steel sheet before and after the forming are the same to those in Example 2-1.

The two-piece aerosol can was manufactured by the following procedure:

(1) Blanking

Blanking was given to steel sheets, prepared from original sheet of TFS, of low carbon cold-rolled steel sheets having each 0.17 to 0.24 mm in sheet thickness, laminated by a polyethylene terephthalate film on both sides thereof by thermofusion method. The range of blank diameter was from 64 to 94 mm.

(2) Drawing and Ironing

Drawing (5 stage) formed the products of r/R in a range from 0.27 to 0.59, and h/(R−r) in a range from 1.35 to 1.89. To manufacture a desired can, ironing was applied as needed. The values of h/(R−r) and r/R after drawing are given in Table 7. The symbols h, r and R in Table 7 designate the height to the opening end in the state of diametral reduction after drawing, the radius of the cylinder integrated with the bottom, and the circular blank positioning radius, respectively. In the drawing, there was applied the forming of tapered part which is an important element of the Second Embodiment. The working method applied was the one using a drawing die in inside-tapered shape, and a blank holder having a tapered tip for drawing. The shape of the taper is given in Table 8. The reference symbols θ, dt and r in Table 8 are the inclination angle of the tapered face inside the can body to the central axis of the can body, the radius of the extended end, and the radius of the can body, respectively.

(3) Dome-Shape Working at Can Bottom

At the can bottom, stretch forming of half-spherical shape with 6 mm in depth was applied.

(4) Trimming

The trimming was given by press-method using an outer cutting edge having a circular hole and an inner cutting edge in cylindrical shape, giving about 1 mm of trimming at the upper end of the can.

(5) Diametral Reduction at Tapered Part

The tapered part was treated by diametral reduction to the diameter of the can body.

(6) Diametral Reduction to a Diameter Smaller than the Diameter of can Body

To the upper part of the cylinder, the diametral reduction was applied, and there were obtained the final can shapes of h/(R−r) in a range from 1.85 to 3.1, and d/R in a range from 0.17 to 0.24. In detail, the die-neck method was applied pressing the opening end against the die in inside-tapered shape to conduct diametral reduction. For the working from the can body diameter to the final drawn diameter, multistage forming was applied depending on the degree of working. The value of d/R and h/(R−r) of the can manufactured by the working are given in Table 3.

(7) Trimming

Trimming was conducted by the method using an inner cutting edge in solid cylindrical shape (inserting inside the can body) and an outer cutting edge in disk shape having sharp edges, mutually rotating. About 1 mm on the upper end of the can was trimmed.

On thus obtained cans for testing, the presence/absence of film separation was inspected. The investigation of presence/absence of film separation was given visually for evaluation. The result is given in Table 7.

TABLE 7

| | Presence of taper | θ (°) | dt/r | Remark | |
|---|---|---|---|---|---|
| A-5 | Yes | 40 | 1.7 | No film separation occurred. | Example |
| A-6 | Yes | 10 | 1.7 | Wrinkles were generated at tapered part. | Comparative Example |
| A-7 | Yes | 40 | 1 | No taper was formed. | Comparative Example |
| A-8 | No | — | — | Film separation occurred. | Comparative Example |
| B-5 | Yes | 40 | 1.7 | No film separation occurred. | Example |
| B-6 | Yes | 10 | 1.7 | Wrinkles were generated at tapered part. | Comparative Example |
| B-7 | Yes | 40 | 1 | No taper was formed. | Comparative Example |
| B-8 | No | — | — | Film separation occurred. | Comparative Example |
| C-5 | Yes | 40 | 1.7 | No film separation occurred. | Example |
| C-6 | Yes | 10 | 1.7 | Wrinkles were generated at tapered part. | Comparative Example |
| C-7 | Yes | 40 | 1 | No taper was formed. | Comparative Example |
| C-8 | No | — | — | Film separation occurred. | Comparative Example |
| D-5 | Yes | 40 | 1.7 | No film separation occurred. | Example |
| D-6 | Yes | 10 | 1.7 | Wrinkles were generated at tapered part. | Comparative Example |
| D-7 | Yes | 40 | 1 | No taper was formed. | Comparative Example |
| D-8 | No | — | — | Film separation occurred. | Comparative Example |

As seen in Table 7, Examples of the Second Embodiment, in which the tapered pat was domed, did not show film separation. On the other hand, Comparative Examples which did not form the tapered part generated film separation, and resulted in exposure of the steel.

The two-piece can according to the Second Embodiment is most suitable for the two-piece aerosol can owing to the superior performance. Other than the two-piece aerosol can, the two-piece can according to the Second Embodiment is suitable for the users which request the can strength, the corrosion resistance, the appearance, and the low manufacturing cost.

The invention claimed is:

1. A method of forming a two-piece can with a laminated steel sheet as a base material comprising:
 a) forming a circular blank by blanking the laminated steel sheet;
 b) forming a can body in a shape of a cylinder having an integrated bottom by applying repeated cycles of drawing to the circular blank;

c) forming a dome protruding inside of the can at a can bottom;
d) trimming an opening of the can body;
e) applying diametral reduction to the opening after trimming to a diameter smaller than the diameter of the can body, while satisfying the formulae (1) and (2);
f) forming a bead at the opening of the can body to obtain the two-piece can; and
g) applying heat treatment to the laminated steel sheet during at least one of steps a)-f), wherein the heat treatment includes heating the laminated steel sheet to a temperature in a range from a glass transition point of a film of the laminated steel sheet to a melting point thereof +30° C., followed by applying rapid cooling to the laminated steel sheet to a temperature of the glass transition point or below within 30 seconds after heating, $$1.5 \leq h/(R-r) \tag{1}$$

$$d/R \leq 0.25 \tag{2}$$

where h is height from the can bottom to a tip of the opening, R is a circular blank positioning radius, r is the radius of the can bottom, and d is the radius of the tip of the opening.

2. The method according to claim 1, further comprising trimming the opening of the can body to form a new opening end, after applying diametral reduction to the opening of the can body.

3. The method according to claim 1, wherein the laminated steel sheet is a steel sheet laminated by a polyester resin.

4. The method according to claim 3, wherein the polyester resin is prepared by polycondensation of a dicarboxylic acid component and a diol component, wherein the dicarboxylic acid component contains terephthalic acid as the main ingredient, and the diol component contains at least one of ethylene glycol and butylene glycol as the main ingredient.

5. The method according to claim 4, wherein an organic resin as the laminate of the laminated steel sheet contains a polyester resin as the main phase, and a resin which is incompatible and has 5° C. or lower Tg as the sub-phase.

6. The method according to claim 5, wherein a resin existing as the sub-phase is a resin selected from the group consisting of polyethylene, an acid modification thereof, an ionomer thereof, polypropylene, an acid modification thereof, and an ionomer thereof.

7. A two-piece can being formed by the method according to claim 1.

8. A laminated steel sheet comprising a laminate of an organic resin film, used for the method according to claim 1.

9. A method of forming a two-piece can with a laminated steel sheet as a base material comprising:
a) forming a circular blank by blanking the laminated steel sheet;
b) forming a can body in a shape of a cylinder having an integrated bottom by applying repeated cycles of drawing to the circular blank;
c) forming a dome protruding inside of the can at the can bottom;
d) trimming an opening of the can body;
e) applying diametral reduction to the opening of the can body after trimming to a diameter smaller than the diameter of the can body, while satisfying the formulae (1) and (2);
f) forming a bead at the opening of the can body to obtain the two-piece can; and
g) applying heat treatment to the laminated steel sheet at a stage that the degree of working is in a range of $0.2 \leq d/R \leq 0.5$ and of $1.5 \leq h/(R-r) \leq 2.5$, wherein the heat treatment includes heating the laminated steel sheet to a temperature in a range from a glass transition point of the film of the laminated steel sheet to a melting point thereof +30° C., followed by applying rapid cooling to the laminated steel sheet to a temperature of the glass transition point or below within 30 seconds after the heating, $$1.5 \leq h/(R-r) \tag{1}$$

$$d/R \leq 0.25 \tag{2}$$

where h is height from the can bottom to a tip of the opening, R is a circular blank positioning radius, r is the radius of the can bottom, and d is the radius of the tip of the opening.

10. A method of forming a two-piece can with a laminated steel sheet as a base material comprising:
a) forming a circular blank by blanking the laminated steel sheet;
b) forming a can body in a shape of a cylinder having an integrated bottom by applying repeated cycles of drawing to the circular blank;
c) forming a tapered part extending outward from the can body in a radial direction thereof at a tip of an opening of the can body;
d) applying diametral reduction to the tapered part to the diameter of the can body; and
e) applying diametral reduction to the opening of the can body to a diameter smaller than the diameter of the can body, while satisfying the formulae (1) and (2), $$1.5 \leq h/(R-r) \tag{1}$$

$$d/R \leq 0.25 \tag{2}$$

where h is height from the can bottom to a tip of the opening, R is a circular blank positioning radius, r is the radius of the can bottom, and d is the radius of the tip of the opening.

11. The method according to claim 10, further comprising trimming to form a new opening end at the tapered part in at least one of: before applying diametral reduction to the tapered part; and after applying diametral reduction to the tapered part.

12. The method according to claim 10, further comprising trimming to form a new opening end at the opening side of the can body after applying diametral reduction to the opening side of the can body.

13. The method according to claim 10, wherein the laminated steel sheet is a steel sheet laminated by a polyester resin.

14. The method according to claim 13, wherein the polyester resin is prepared by polycondensation of a dicarboxylic acid component and a diol component, wherein the dicarboxylic acid component contains terephthalic acid as the main ingredient, and the diol component contains ethylene glycol and/or butylene glycol as the main ingredient.

15. The method according to claim 14, wherein an organic resin as the laminate of the laminated steel sheet contains a polyester resin as a main phase, and a resin which is incompatible and has 5° C. or lower Tg as a sub-phase.

16. The method according to claim 15, wherein the resin existing as the sub-phase is a resin selected from the group consisting of polyethylene, an acid modification thereof, an ionomer thereof, polypropylene, an acid modification thereof, and an ionomer thereof.

17. A two-piece can formed by the method according to claim 10.

18. A laminated steel sheet comprising a laminate of an organic resin film, used for the method according to claim 10.

19. The method according to any of claims 1, 9 and 10, further comprising ironing the can body.

20. The method according to any of claims 1, 9 and 10, wherein the number of drawing cycles for forming the two-piece can of the laminated steel sheet is at least one but no more than 10.

21. The method according to any of claims 1, 9 and 10, wherein the drawing rate on forming the two-piece can of the laminated steel sheet is 0.4 or more for the first drawing cycle on the circular blank, and 0.5 or more for succeeding drawing (re-drawing) cycles.

22. The method according to any of claims 1, 9 and 11, wherein the average sheet thickness change rate during drawing is in a range of $0.5 < t/t_0 < 1.5$, where t is the average sheet thickness over the entire sheet thickness of the side wall of the can body, and $t_0$ is the original sheet thickness.

23. The method according to any of claims 1, 9 and 10, wherein the degree of working upon applying diametral reduction to the opening end of the two-piece can of the laminated steel sheet is in a range of $d/r > 0.3$, where r is the radius of the can body, and d is the radius of the opening end after the diametral reduction.

24. The method according to any of claims 1, 9 and 10, wherein the steel sheet becoming the substrate of the laminated steel sheet contains at least one of the following:

(1) a steel sheet of a low carbon steel of an approximate range from 0.01 to 0.10% C, being prepared by recrystallization annealing by box annealing;
(2) a steel sheet of a low carbon steel of an approximate range from 0.01 to 0.10% C, being prepared by recrystallization annealing by continuous annealing;
(3) a steel sheet of a low carbon steel of an approximate range from 0.01 to 0.10% C, being prepared by recrystallization annealing by continuous annealing, followed by over-aging;
(4) a steel sheet of a low carbon steel of an approximate range from 0.01 to 0.10% C, being prepared by recrystallization annealing by box annealing or continuous annealing, followed by secondary cold-rolling (cold-rolling after annealing); and
(5) an IF steel (interstitial free steel) of a very low carbon steel of an approximate range of 0.003% or less C with the addition of a solid-solution C-fixing element, prepared by recrystallization annealing by continuous annealing.

25. The method according to any of claims 1, 9 and 10, wherein the method for applying diametral reduction to the laminated steel sheet is at least one of the die-curling method and the spinning method.

* * * * *